United States Patent
Luszik-Bhadra et al.

(10) Patent No.: US 7,208,743 B2
(45) Date of Patent: Apr. 24, 2007

(54) METHOD AND DEVICE FOR DETERMINING THE PERSONAL DOSE IN MIXED NEUTRON/PHOTON FIELDS

(75) Inventors: Marlies Luszik-Bhadra, Braunschweig (DE); Wilfried Wendt, Braunschweig (DE)

(73) Assignee: Bundesrepublik Deutschland, vertreten durch das Bundesministerium für Wirtschaft und Arbeit, dieses wiederum vertreten durch den Präsidenten der Physikalisch-Technischen Bundesanstalt, Braunschweig (DE)

( * ) Notice: Subject to any disclaimer, the term of this patent is extended or adjusted under 35 U.S.C. 154(b) by 302 days.

(21) Appl. No.: 10/483,222

(22) PCT Filed: Jul. 9, 2002

(86) PCT No.: PCT/DE02/02509

§ 371 (c)(1),
(2), (4) Date: Jan. 9, 2004

(87) PCT Pub. No.: WO03/007018

PCT Pub. Date: Jan. 23, 2003

(65) Prior Publication Data

US 2004/0188677 A1    Sep. 30, 2004

(30) Foreign Application Priority Data

Jul. 9, 2001    (DE) .............................. 101 32 550

(51) Int. Cl.
*G01T 3/08*    (2006.01)
*G01T 1/24*    (2006.01)

(52) U.S. Cl. ...................... 250/390.03; 250/370.05; 250/370.06; 250/370.07

(58) Field of Classification Search .......... 250/390.03, 250/370.05
See application file for complete search history.

(56) References Cited

U.S. PATENT DOCUMENTS

| | | | | |
|---|---|---|---|---|
| 3,988,586 A | * | 10/1976 | Stuart et al. ........... | 250/390.11 |
| 5,083,028 A | * | 1/1992 | Decossas et al. ...... | 250/390.03 |
| 5,192,490 A | * | 3/1993 | Burel ...................... | 376/154 |
| 5,347,129 A | * | 9/1994 | Miller et al. ............ | 250/336.1 |

(Continued)

FOREIGN PATENT DOCUMENTS

DE    35 14107    10/1986

OTHER PUBLICATIONS

Siemens Technical Handbook titled:"Neutron Sensitive Electronic Personal Dosemeter (EPD-N Mk 2.0)". Dated Sep. 4, 2000; Issue 1.

(Continued)

*Primary Examiner*—Albert Gagliardi
(74) *Attorney, Agent, or Firm*—Whitham Curtis Christofferson & Cook, PC

(57) ABSTRACT

The invention relates to an instrument which uses an individual semi-conductive detector with special coverings as an essential sensor, and a method whereby the amplitude information of the signals from said semi-conductive detector are used to determine a person's dose in mixed neutron/photon-fields. Said instrument is highly sensitive and has a low energy dependency. It is possible for the dose to be read directly, and to emit a warning if the dose limit is exceeded. The inventive method enables a compact person's dose meter, which is immune to interference, to be produced with low power consumption.

4 Claims, 4 Drawing Sheets

U.S. PATENT DOCUMENTS

| | | | | |
|---|---|---|---|---|
| 5,406,086 A | * | 4/1995 | Barthe et al. | 250/390.03 |
| RE35,908 E | * | 9/1998 | Kitaguchi et al. | 250/370.05 |
| 6,362,485 B1 | * | 3/2002 | Joyce et al. | 250/390.01 |
| 6,423,972 B1 | * | 7/2002 | Fehrenbacher et al. | 250/370.05 |
| 2005/0258372 A1 | * | 11/2005 | McGregor et al. | 250/390.01 |

OTHER PUBLICATIONS

Handbook titled: Irradiation facility radioactive reference neutron sources: Basic principles by Hermann Kluge; dated Jun. 1998.

Article titled: The Calibration of Secondary Ionisation Chambers in High Energy Photon Fields; by S. Guldbakk et al. dated 1991; vol. 35 No. 4 pp. 237-240.

Article titled: X-Ray Spectrometry of Low Energy Photons For Determining Conversion Coefficients From Air Kerma, Kn to Personal Dose Equivalent, Hp (10), for Radiation Qualities of the ISO Narrow Spectrum Series, vol. 81 No. 4 pp. 247-258: dated 1999; By U. Ankerhold et al.

Article titled: The development of new generation electronic personal dosimeters; pp. 1-8, By Kei Aoyama et al. dated 2000.

Article titled: Response of Convertor Semiconductor Detectors of Neutron Radiation vol. 28 No. 1-6 pp. 429-434 dated 1997 by G. Fehrenbacher et al.

* cited by examiner

METHOD AND DEVICE FOR DETERMINING THE PERSONAL DOSE IN MIXED NEUTRON/PHOTON FIELDS

FIELD OF APPLICATION

The invention relates to a method for determining the personal dose in combined neutron/photon fields.

The invention furthermore relates to a device for carrying out the method.

PRIOR ART

A plurality of direct-reading personal dosimeters are known, which are suitable for radiation fields that consist exclusively of photons. For radiation fields in which neutrons and photons are found in combination, however, only two instruments are known at present. Both instruments only provide unsatisfactory results, especially for measuring the personal dose of neutron radiation.

One of these two known instruments [1] uses four semiconductor counters for its measurements. In this case, however, the response characteristic for the neutron dose, which should be as constant as possible in the energy range of from a few keV a few MeV, varies by more than a factor of 100.

The other of the two instruments [Siemens EPD-nMk2.0; specifications are taken from the manual and labeling of the instrument itself, publications about the structure are not known] uses three semiconductor counters. The energy range for the detection of neutrons is restricted here to the thermal to intermediate range. This instrument is therefore insensitive in essential ranges of application of personal dosimetry to neutrons.

In the evaluation method used to determine the neutron dose, it is known that the high-energy ranges of the pulse-amplitude spectrum are evaluated, these being-due to charged nuclei created by neutrons [2]. This method, however, is unsuitable for the evaluation of a neutron dose and a photon dose.

OBJECT

The invention addresses this. It is an object to develop a direct-reading personal dosimeter for combined neutron/photon fields which, in relevant operating ranges, allows correct dose determination for the two radiation fields separately and for the overall dose. A method has furthermore been selected which allows the design to be as small and simple as possible, since more complex constructions increase the susceptibility to interference and the cost price.

SOLUTION

This object is achieved according to the invention, with a method of the type mentioned in the introduction, in that only a single semiconductor counter is used to determine both the neutron dose and the photon dose, and in that the pulse-amplitude information from the semiconductor counter is used to determine the neutron dose and the photon dose, wherein the pulses in a suitable pulse-amplitude interval are added up and divided by an average response characteristic and both the neutron dose and the photon dose are determined simultaneously in this way.

It is preferable in this case for a semiconductor counter to be used which, with a sensitive area of between 0.1 cm$^2$ and 30 cm$^2$ for an applied voltage of between 1 V and 100 V, has a sensitive depleted layer with a thickness of between 1 µm and 400 µm as well as a dead layer with a thickness of between 10 nm and 20 µm in front of the sensitive layer, in which there is an air gap in front of the detector, a first converter which consists of materials with $^6$Li or $^{10}$B content and has thicknesses of from 0.1 µm to 2.5 cm is fitted in front of the air gap, a second converter which consists of plastic containing hydrogen with a thickness of up to 2.5 cm is fitted in front of the first converter, and an absorber consisting of materials with $^6$Li, $^{10}$B or Cd content and a thickness of from 0.1 mm to 2 cm surrounds the semiconductor, the air gap and the first and second converters.

In order to achieve said object, a device of the type of mentioned in the introduction is furthermore characterized by only a single semiconductor counter and an evaluation unit for the pulse-amplitude information from the semiconductor counter, for simultaneously determining the neutron dose and the proton dose by adding up the pulses in a suitable pulse-amplitude interval and dividing by an average response characteristic.

It is preferably in this case for
a) the semiconductor counter, with a sensitive area of between 0.1 cm$^2$ and 30 cm$^2$ for an applied voltage of between 1 V and 100 V, to have a sensitive depleted layer with a thickness of between 1 µm and 400 µm as well as a dead layer with a thickness of between 10 nm and 20 µm in front of the sensitive layer,
b) there to be an air gap (up to 2 cm wide) in front of the detector,
c) a first converter which consists of materials with $^6$Li or $^{10}$B content and has thicknesses of from 0.1 µm to 2.5 cm to be fitted in front of the air gap,
d) a second converter which consists of plastic containing hydrogen with a thickness of up to 2.5 cm to be fitted in front of the first converter, and
e) an adsorber consisting of materials with $^6$Li or $^{10}$B content and a thickness of from 0.1 mm to 2 cm to surround the semiconductor, the air gap and the first and second converters.

DISCLOSURE

The device according to the invention, and the corresponding method, utilize the fact that owing to the relatively small energy loss of their secondary electrons, photons predominantly give rise to signals in the low-energy range of the pulse-amplitude spectrum.

The opportunity to determine a neutron dose and a photon dose simultaneously is a particular novelty, and makes it possible to construct simple direct-reading dosimeters. The probe, the photon response characteristic, the lower measurement threshold and the behavior in combined neutron/photon fields will be described below with reference to an example and then generalized:

Experiments were carried out with the detector probe schematically represented in FIG. 1, which has the following structure:

n-type silicon detector (1): 257 µm, 560 Ωcm, 1 cm$^2$ effective area,
depleted sensitive layer (2): 40 µm thickness,
dead layer (3): 50 nm thickness,
air gap (4): 0.4 mm thickness,
converter 1 (5): $^6$LiF, 3.6 µm thickness,
converter 2 (6): polyethylene, 1 mm thickness,
absorber (7): polyethylenes +50% B$_4$C, 2 mm thickness,
voltage (8): 9 V.

Converters 1 and 2 (5, 6) are optimized for neutron detection. They consist essentially of plastic, plastic containing boron and a thin $^6$LiF layer in front of the silicon detector. A depleted sensitive layer (2) of 40 µm is created by the applied voltage of 9 V. This thin layer reduces the sensitivity to photon radiation so that this does not cause interference when determining the neutron dose, for which the high-energy range of the pulse-amplitude spectrum is used (>1.5 MeV).

There is nevertheless a high sensitivity for photons in the low-energy range of the pulse-amplitude spectrum. In order to construct a dosimeter that is as simple as possible, it is possible to employ the signals of the same detector probe to determine the photon dose, and to minimize the effect of the signals created by neutrons on the photon reading in combined neutron/photon fields.

To this end, the dosimeter probe was irradiated in an ISO water phantom with X-radiation of the N series, using $^{137}$Cs, $^{60}$Co, 4.4 MeV and from 6 to 7 MeV gamma radiation [3, 4]. The signals of the semiconductor detector were amplified using conventional nuclear electronics, and their pulse-amplitude spectrum was recorded. The energy calibration was carried out with α particles from a $^{241}$Am source. The energy resolution was about 30 keV. The measured pulse-amplitude spectra, normalized to a photon personal dose $H_p(10)=1$ mSv, are represented in FIG. 2. The overlap of the curves at the low-energy signals of the pulse-amplitude spectra shows that the simplest solution for an almost constant $H_p(10)$ response characteristic involves integration of the pulses in a single interval around about 100 keV. Since the intensity is particularly high in this interval when irradiating with photons, the effect of neutrons on the photon reading is minimized.

FIG. 3 shows the response characteristic as a function of the average photon energy when using integration of pulses in the pulse-amplitude range of from 60 keV to 150 keV. The irradiations were carried out with incidence normal to the detector surface (0°) and—in a few cases—at 60° to the detector normal. All the values deviated by less than 30% (see the dotted lines in FIG. 3) from the average value (323 pulses per μSv, see solid line in FIG. 3) for irradiations with photons in the energy range of from 80 keV to 7 MeV. The drop at small photon energies (N80, average energy 65 keV) is probably due to the electronic threshold, which was set about 70 keV in order to minimize the background connected with the electronic noise.

The lower detection threshold depends both on the noise- and on the background signals (due to the natural terrestrial radiation). A measurement over five days in the laboratory gave a photon dose reading of 2.6 μSv. This value is almost negligible for applications in radiation protection, although it may also be subtracted for more accurate measurements. A lower detection threshold of the order of one 1 μSv is readily achievable with a measurement duration of 8 hours.

In combined neutron/photon fields, neutrons can also produce signals in the low-energy range of the pulse-amplitude spectrum, primarily as a result. of neutrons scattered elastically from silicon [5]. Since exact calculations are unavailable for the device according to the invention, the possible effect was studied by measurements in different neutron calibration fields. FIG. 4 shows a measurement which was carried out with a $^{241}$Am-Be neutron source (1 mm Pb to shield against low-energy photons). The measurement is normalized to a personal neutron dose $H_p(10)=1$ mSv.

Comparison with the response characteristic for photons clearly shows that possible contributions are less than a few percent in the pulse-amplitude range around 100 keV. Furthermore, the shape of the distribution in the low-energy pulse-amplitude range has a similar appearance to the photon response characteristic. Since the neutron calibration fields generally include low levels of a photon dose and the effect can also depend on the neutron energy spectrum, irradiations were carried out with neutrons from different sources, which produce neutrons with energy between thermal and 14.8 MeV, and the photon dose which is determined from the pulse-amplitude signals of the semiconductor detector, using knowledge of the average response characteristic, is compared with the results of a GM counter. The measurements with a GM counter tube were carried out free-in-air, and the measured values were corrected for the neutron response characteristic of the GM counter tube [6, 7].

Since the GM counter was calibrated in the photon field of a $^{60}$Co source, but no corrections were made for photon energy, in the case of the 241Am-Be source with which photons are emitted at higher energies (4.45 MeV), values up to a factor of 1.7 too high are recorded owing to the greater response characteristic of the GM counter at these energies.

The results of the relative photon-to-neutron dose are given in Table 1. With the exception of the measurement using the $^{241}$Am-Be source, the relative photon-to-neutron ratios which were determined with the semiconductor counter are slightly higher than the results of the GM counter (up to 2%). These high values may be due either to the direct source photons or photons created by neutrons in the phantom. In all cases, however, the effect however is small and acceptable.

TABLE 1

Comparison of the ratio of photon-to-neutron equivalent dose measured with the semiconductor dosimeter $(H_\gamma/H_n)_{Mess.}$ with values measured using the GM counter $(H_\gamma/H_n)_{GM}$ for different neutron calibration fields.

| Neutron field | $(H_\gamma/H_n)_{GM}$ | $(H_\gamma/H_n)_{Mess.}$ |
| --- | --- | --- |
| $^{252}$Cf | 0.038 | 0.046 |
| $^{252}$Cf (mod) | 0.13 | 0.151 |
| $^{241}$Am—Be | 0.034 | 0.015 |
| 14.8 MeV | 0.0012 | 0.0055 |

For additional photon detection, the "low-power" electronics (amplifier, ADC, microprocessor) already developed for a neutron dosimeter need to be modified using known methods, in order to achieve a better resolution in the low-energy in pulse-amplitude range.

It has been shown with reference to an example that a dosimeter, with which both the neutron dose and the photon dose can be determined, can be constructed by using a single semiconductor detector with special converters and absorbers, optimized for the determination of a neutron dose, and the pulse-amplitude information of a dosimeter. While the neutron dose is determined on the basis of signals that are caused by energy depositions above 1.5 MeV, pulse-amplitude signals of from 80 keV to 150 keV are used for determining the photon dose.

This provides a response characteristic which varies by less than 30% in the photon energy range of from 80 keV to 7 MeV for irradiations with incidence normal to the detector surface and at 60° to the detector normal. The lower detection limit is of the order of 1 μSv. In combined neutron/photon fields, neutrons contribute by less than 2% to the photon reading.

A solution according to the principle described in the example is, in general, also possible when the parameters of the probe design and the ranges of the pulse-amplitude spectrum are varied within certain limits:

Possible modifications to the probe design:
  semiconductor detector (1): 0.1 cm² to 30 cm² area
  depleted sensitive layer (2): 1 μm to 400 μm thickness
  dead layer (3): 10 nm to 20 μm thickness
  air gap (4): 0 to 2 cm
  converter 1 (5): materials with $^6$Li or $^{10}$B converter 2 (6): plastic containing hydrogen: 0 to 2.5 cm
absorber (7): materials with $^6$Li, $^{10}$B or Cd, 0.1 mm to 2 cm thickness,
voltage (8): 1 V to 100 V The following modifications to the ranges of the pulse-amplitude spectrum are likewise possible in this case:
photons: 10 keV to 2 MeV
neutrons: >300 keV Said possible modifications to the probe parameters and the modifications in the ranges of the pulse-amplitude spectrum make it possible to use the probe in other radiation fields as well, for example muons and electrons, in which case other measurement quantities such as the ambient equivalent dose, kerma, and biological dose may be measured.

All the energies mentioned above are based on an energy calibration with a radiation from a $^{241}$Am source.

PREFERRED APPLICATIONS

The method according to the invention is preferably used in order to determine the personal dose in workplaces where combined radiation of photons and neutrons is found. The low-energy dependency of the instrument, the direct reading of the dose and the incorporation of alarm thresholds leads to significant improvements in radiation protection. Possible fields of application include measuring the personal dose of escorts for transport containers of fuel elements (e.g. CASTOR), employees in nuclear power plants, staff in high-energy particle accelerators, pilots and cabin crew of aircraft.

LITERATURE

Figure 1:
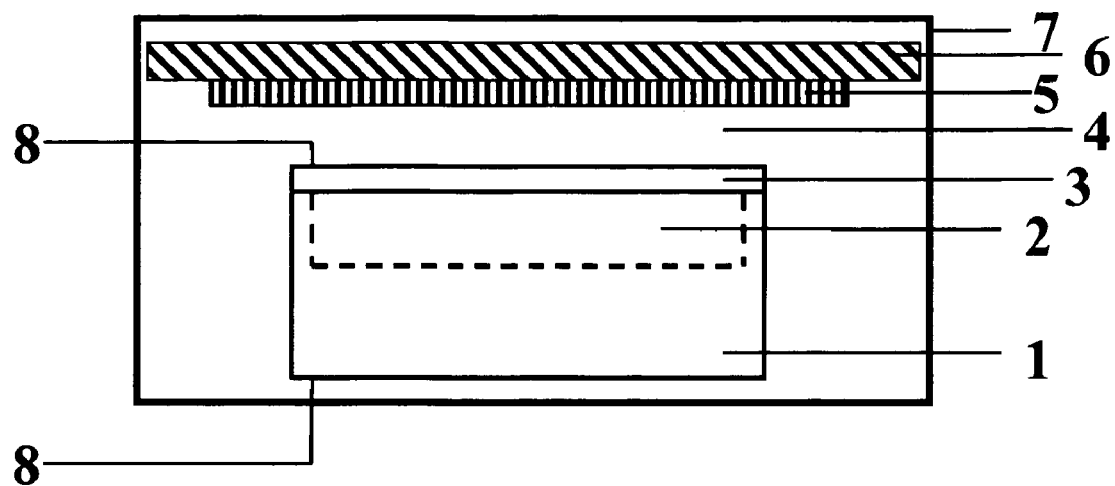
FIG. 1: schematic structure of the dosimeter probe:
1. n-type silicon detector: 257 μm, 560 Ωcm, 1 cm$^2$ effective area
2. depleted sensitive layer: 40 μm
3. dead layer: 50 nm
4. air gap: 0.4 mm
5. converter 1: $^6$LiF, 3.6 μm
6. converter 2: polyethylene, 1 mm
7. absorber: polyethylene +50% B$_4$C, 2 mm
8. voltage: 9 V.
Figure 2:
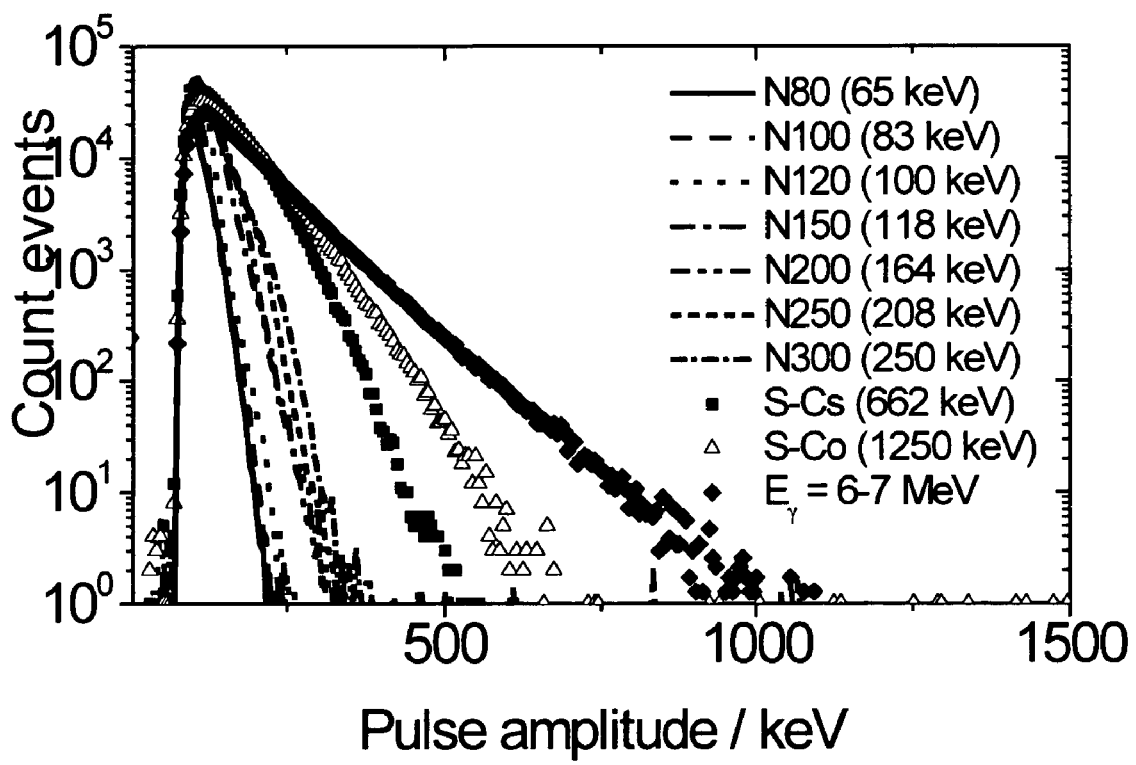
FIG. 2:
Pulse-amplitude spectra, measured for photon spectra with different radiation qualities. The radiation qualities are specified in the drawing (average energies in brackets). All measurements were normalized to H$_p$(10)=1 mSv. The electronic threshold that is used corresponds to a deposited energy of 70 keV (calibration with a $^{241}$Am α source).
Figure 3:
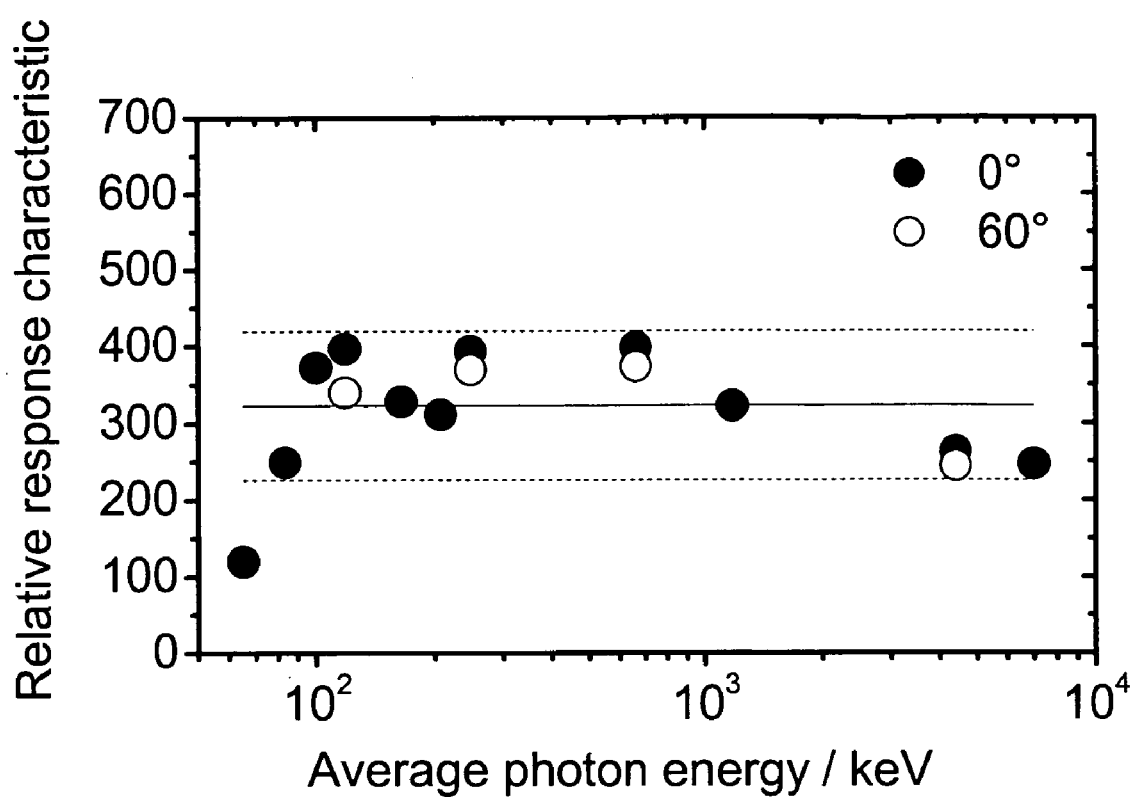
FIG. 3:
Relative response characteristics of the dosimeter H$_p$(10) for the same photons as in FIG. 2, given as a function of the average photon energy. The dotted lines indicate 30% deviations from the average value (solid line).
Figure 4:
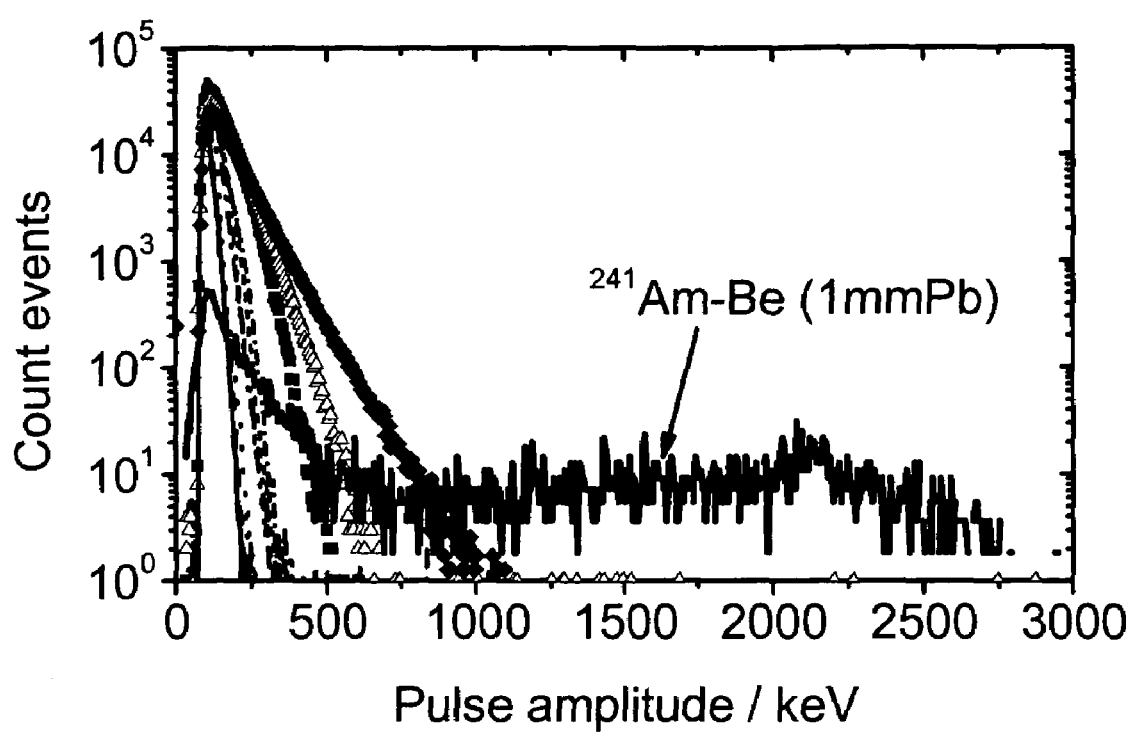
FIG. 4:
Pulse-amplitude spectra measured with a $^{241}$Am-Be neutron source. The pulse-amplitude spectra of the photon measurements from FIG. 2 are included for comparison.

1. Aoyama, K., Nagase, Y. Suzuki, T., Watanabe, S., Taniguchi, K., Muramatsu, K. Fujita, M. and Fuji, Y. The Development of New Generation Electronic Personal Dosimeters. Proceedings of IRPA-10, 10th International Congress of the International Radiation Protection Association, CD-ROM, IRPA, Hiroshima (2000).
2. Luszik-Bhadra, M., A Prototype Personal Neutron Dosemeter with one Silicon Diode. Contribution to "European Workshop on a Monitoring of External Radiation", Sep. 4–6, 2000, Helsinki, Radiat. Prot. Dosim. (being printed).
3. Ankerhold, U., Behrens, R., Ambrosi, P. X-ray spectrometry of low energy photons for determining conversion coefficients from air kerma, Ka, to personal dose equivalent, Hp(10), for radiation qualities of the ISO narrow spectrum series. Radiat. Prot. Dosim. 81, 247–258 (1999).
4. Guldbakke, S., Rossiter, M. J., Schaffler, D. and Williams, T. T. The Calibration of Secondary Standard Ionisation Chambers in High Energy Photon Fields. Radiat. Prot. Dosim. 35, 237–240 (1991).
5. Fehrenbacher, G., Biersack, J., Cordes, E. and Wahl, W. Response of Converter Semiconductor Detectors on Neutron Radiation. Radiat. Meas. 28, 429–434, 1997.
6. Kluge, H. Irradiation Facility with Radioactive Reference Neutron Sources: Basic Principles. Report PTB-N-34 (1998).
7. Neumann, S., Guldbakke, S., Matzke, M. and Sosaat, W. Photon Spectrometry in Monoenergetic Neutron Fields. PTB report (being printed).

The invention claimed is:

1. An apparatus for determining a personal dose equivalent on a combined neutron/photon field, comprising:
a single semiconductor neutron and photon detector, constructed and arranged to detect neutrons and photons, and to output a corresponding pulse signal having an amplitude statistically representative of whether a neutron or photon is detected; and
a dose equivalent detector, constructed and arranged to receive said pulse signals and, based on a count of said pulse signals and the amplitudes of said pulse signals, to generate a total dose equivalent data representing a total dose of neutrons and a total dose of photons detected over the same given time period.

2. The apparatus of claim 1, wherein the semiconductor detector includes a silicon detector having a sensitive depleted layer, and wherein the thickness of said layer is between approximately 1 μm and 400 μm.

3. The apparatus of claim 1
wherein the semiconductor detector includes a silicon detector having a sensitive depleted layer, and wherein
neutron converters, constructed and arranged to convert thermal neutrons, and fast neutrons into emitted protons, is arranged in front of said sensitive depleted layer, and
wherein said neutron converters each include one or more materials having a $^6$Li and $^{10}$B content, for detecting the thermal neutrons, and a plastic containing hydrogen, for detecting the fast neutrons.

4. The apparatus of claim 3, further comprising a thermal neutron absorber, formed of materials including $^6$Li and $^{10}$B, surrounding said single semiconductor detector and neutron converters, constructed and arranged to reduce a thermal neutron sensitivity of said semiconductor counter and said neutron converter.

* * * * *